United States Patent
Walthert et al.

(10) Patent No.: US 10,995,806 B2
(45) Date of Patent: May 4, 2021

(54) HUB, IN PARTICULAR FOR BICYCLES

(71) Applicant: DT SWISS INC., Grand Junction, CO (US)

(72) Inventors: Martin Walthert, Aarberg (CH); Stefan Spahr, Lengnau (CH)

(73) Assignee: DT SWISS INC., Grand Junction, CO (US)

( * ) Notice: Subject to any disclaimer, the term of this patent is extended or adjusted under 35 U.S.C. 154(b) by 93 days.

(21) Appl. No.: 16/039,831

(22) Filed: Jul. 19, 2018

(65) Prior Publication Data

US 2019/0032730 A1 Jan. 31, 2019

Related U.S. Application Data

(63) Continuation-in-part of application No. 15/882,423, filed on Jan. 29, 2018, now Pat. No. 10,625,540.
(Continued)

(30) Foreign Application Priority Data

Jul. 26, 2017 (DE) .................. 10 2017 116 960

(51) Int. Cl.
*B60B 27/04* (2006.01)
*B60B 27/00* (2006.01)
(Continued)

(52) U.S. Cl.
CPC .......... *F16D 41/36* (2013.01); *B60B 27/0031* (2013.01); *B60B 27/0047* (2013.01);
(Continued)

(58) Field of Classification Search
CPC ... B60B 27/047; B60B 27/001; B60B 27/023; B60B 27/0073; B60B 27/0031;
(Continued)

(56) References Cited

U.S. PATENT DOCUMENTS 5,460,254 A 10/1995 Huang
5,492,211 A 2/1996 Wu
(Continued)

FOREIGN PATENT DOCUMENTS

CN 205044904 U 2/2016
DE 19856626 A1 6/2000
(Continued)

OTHER PUBLICATIONS

European Search Report from corresponding European Patent Application No. 17183420.3-1762, dated Nov. 24, 2017.

*Primary Examiner* — Tinh Dang
(74) *Attorney, Agent, or Firm* — Greer, Burns & Crain, Ltd.

(57) ABSTRACT

Bicycle hub includes a shell rotatably supported relative to a hub axle, a rotor rotatably supported by two rotor bearings, and a freewheel device having two interacting freewheel components: a hub-side freewheel component and a rotor-side freewheel component. The freewheel components each include axial engagement elements and are axially movable relative to one another between a freewheel position and an engaging, driving torque position. The hub-side freewheel component includes a threaded axial body section and is screwed into the hub shell. The hub-side freewheel component has an axial, annular surface on which the axial engagement elements are configured. The rolling members of a hub bearing show a defined accommodation inside the hub-side freewheel component to support the shell relative to the hub axle. The hub-side freewheel component includes a tool contour which couples to an adapted tool for releasing the screw connection of the hub-side freewheel component with the shell.

18 Claims, 5 Drawing Sheets

Related U.S. Application Data which is a continuation-in-part of application No. 15/659,830, filed on Jul. 26, 2017, now Pat. No. 10,442,245, and a continuation-in-part of application No. 15/659,850, filed on Jul. 26, 2017, now Pat. No. 10,549,578.

(51) Int. Cl.
| | | |
|---|---|---|
| *F16D 41/24* | (2006.01) | |
| *F16D 41/36* | (2006.01) | |
| *F16D 41/30* | (2006.01) | |
| *B62M 6/40* | (2010.01) | |
| *B60B 27/02* | (2006.01) | |
| *F16D 41/26* | (2006.01) | |
| *F16C 35/077* | (2006.01) | |
| *F16C 19/06* | (2006.01) | |

(52) U.S. Cl.
CPC .......... *B60B 27/023* (2013.01); *B60B 27/047* (2013.01); *F16C 35/077* (2013.01); *F16D 41/26* (2013.01); *F16D 41/30* (2013.01); *B60B 2900/111* (2013.01); *B60B 2900/311* (2013.01); *B60B 2900/541* (2013.01); *F16C 19/06* (2013.01); *F16D 2300/12* (2013.01)

(58) Field of Classification Search
CPC ............ B60B 27/0078; B60B 27/0047; B60B 2380/14; B60B 2900/111; B60B 2900/311; B60B 27/0015; B60B 2320/10; B60B 2360/102; B60B 2360/36; B60B 2900/113; B60B 2900/321; B60B 2900/531; B60B 2900/541; F16D 41/24; F16D 41/36; F16D 41/30; F16D 2121/14; F16D 2200/0021; F16D 2200/006; F16D 2250/0084; F16D 2300/12; B62M 6/40; F16C 35/077; F16C 16/06
See application file for complete search history.

(56) References Cited

U.S. PATENT DOCUMENTS

| | | | |
|---|---|---|---|
| 5,676,227 A | 10/1997 | Hügi | |
| 5,718,315 A | 2/1998 | Chen | |
| 5,738,197 A | 4/1998 | Kröger et al. | |
| 5,950,784 A | 9/1999 | Yang | |
| 6,065,580 A | 5/2000 | Kirk | |
| 6,588,564 B1 | 7/2003 | Jäger et al. | |
| 6,669,306 B1 | 12/2003 | Hara et al. | |
| 7,562,755 B2* | 7/2009 | Spahr ................. | B60B 27/0073 192/30 V |
| 7,641,904 B2 | 1/2010 | Kim et al. | |
| 8,757,341 B2 | 6/2014 | Klieber | |
| 8,936,144 B2 | 1/2015 | Spahr et al. | |
| 9,010,875 B2 | 4/2015 | Spahr et al. | |
| 9,212,708 B2* | 12/2015 | Spahr ..................... | F16D 27/01 |
| 10,065,452 B2 | 9/2018 | Walthert et al. | |
| 2004/0140709 A1 | 7/2004 | Kanehisa | |
| 2005/0184580 A1 | 8/2005 | Kuan et al. | |
| 2006/0043786 A1 | 3/2006 | Lin | |
| 2007/0240945 A1 | 10/2007 | Hirotomi et al. | |
| 2008/0006500 A1 | 1/2008 | Spahr | |
| 2009/0277741 A1* | 11/2009 | Chen .................... | B60B 27/023 192/64 |
| 2010/0170762 A1 | 7/2010 | Schlanger | |
| 2012/0048671 A1 | 3/2012 | Kozak et al. | |
| 2013/0088075 A1 | 4/2013 | Spahr et al. | |
| 2013/0105266 A1 | 5/2013 | Spahr et al. | |
| 2013/0126292 A1 | 5/2013 | Lin | |
| 2014/0062164 A1 | 3/2014 | Spahr et al. | |
| 2018/0029412 A1 | 2/2018 | Walthert et al. | |
| 2018/0029413 A1 | 2/2018 | Walthert et al. | |
| 2018/0050564 A1 | 2/2018 | Walthert et al. | |
| 2019/0030951 A1 | 1/2019 | Walthert et al. | |
| 2019/0032730 A1 | 1/2019 | Walthert et al. | |

FOREIGN PATENT DOCUMENTS

| | | |
|---|---|---|
| DE | 102010033268 A1 | 2/2010 |
| DE | 102010033268 A1 | 2/2012 |
| FR | 1105376 A | 11/1955 |
| GB | 572237 A | 9/1945 |
| GB | 668943 A | 3/1952 |
| JP | 59175637 A | 10/1984 |

\* cited by examiner

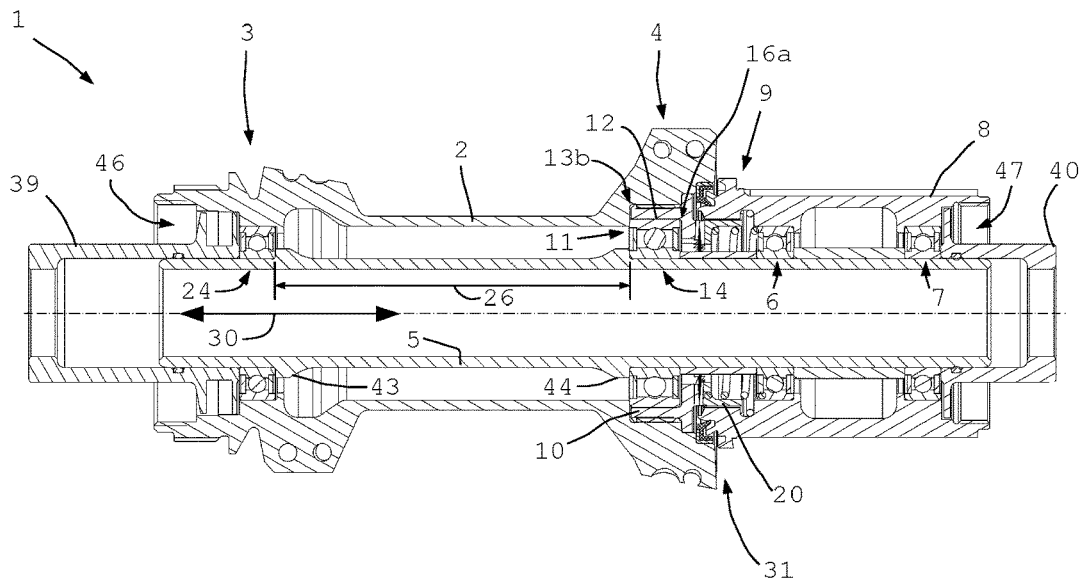
Fig. 8
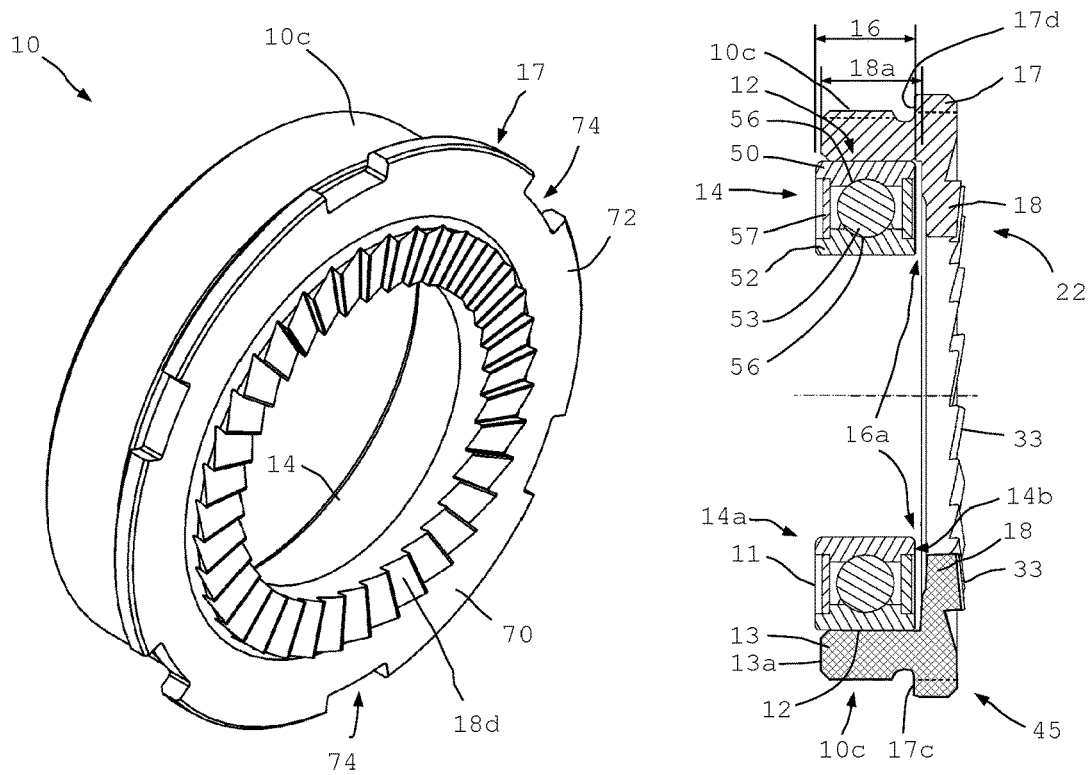
Fig. 9
Fig. 10

HUB, IN PARTICULAR FOR BICYCLES

RELATED APPLICATIONS

The present application is a CIP of, and claims 35 USC 120 priority from Ser. No. 15/882,423 filed Jan. 29, 2018, which is a CIP of and claims 35 USC 120 priority from U.S. Ser. No. 15/659,830 filed Jul. 26, 2017 and U.S. Ser. No. 15/659,850 filed Jul. 26, 2017, all of which are incorporated by reference.

BACKGROUND

The present invention relates to a hub for at least partially muscle-powered vehicles and in particular bicycles, the hub comprising a hub shell which is rotatably supported relative to a hub axle by way of two roller bearings disposed on opposite end regions of the hub shell. The hub comprises a rotor for non-rotatable arrangement of at least one sprocket, the rotor being rotatably supported relative to the hub axle by means of at least two rotor bearings. A freewheel device is provided between the rotor and the hub shell.

Other than in bicycles, the hub may be used in other partially muscle-powered vehicles and two-wheeled vehicles which are for example provided with an electric auxiliary drive. The hub is in particular used in sports bicycles.

The prior art has disclosed various hubs comprising a freewheel so that the pedal crank will not keep rotating along for example during a downhill ride. This freewheel also allows contrarotating of the hub shell and the rotor in backpedaling.

The prior art has disclosed hubs with ratchet freewheels where the pawls can radially pivot between a freewheel position and an engaging position. These hubs are provided with different numbers of ratchet pawls and tend to show four ratchet pawls symmetrically distributed over the circumference. As force is transmitted, the ratchet pawls engage a toothing in the rotor. The relatively low number of ratchet pawls results in a relatively large angle of rotation until rotational force is transmitted when pedalling is resumed.

GB 668,943 has disclosed a freewheel hub for bicycles showing screwed into the hub shell a shell-shaped part whose inside surface forms the raceway for the ball of the ball bearing, while a radially outwardly extending wall has an axial toothing formed thereat which together with an axial toothing forms an axial freewheel at the rotor. Due to the larger number of teeth of the axial toothing, re-engagement is faster as pedaling is resumed. The drawback of this system is that the rotor shifts in the axial direction when the hub is transferred to the freewheeling state and the engaged state. With the systems used today this might cause a gear shift. Moreover, dirt and moisture might enter the freewheel, impeding or even entirely disabling the function which is dangerous to the rider.

DE 94 19 357 U1 has disclosed a hub with a toothed disk freewheel which reliably and very quickly transmits the driving force from the rotor to the hub shell while otherwise, friction losses are relatively low while the user does not activate the pedals. A toothed disk freewheel has many advantages and allows particular fast response of the freewheel. In this freewheel, a pair of toothed disks transmits forward rotational force of the rotor while in backpedaling, the teeth disengage axially. The known hub per se functions satisfactorily and is used in the area of sports and also in professional riding. However, there is the disadvantage that the high loads acting on the hub for example in uphill rides may generate bending moments in the hub so as to cause the toothed disk to slightly tilt which results in higher wear on the teeth which are subjected to higher forces so that durability is limited and the toothed disks require early replacement to avoid malfunction. DE 10 2010 033 268 A1 discloses a hub in which two end-toothed components form an axial freewheel. Pairs of adjacent hub bearings at the hub shell ends serve as supports relative to the hub axle. The drawback is the high space requirement for the adjacent hub bearings. Moreover, the hub axle is not provided with any radial shoulders so that it cannot serve for axially supporting the hub components. Therefore, to axially support the hub the axial force is transmitted from a roller bearing into the hub shell on one side and on the other side it is abducted through a roller bearing via sleeve elements disposed on the hub axle. In another embodiment shown in a simplistic illustration, one or two hub bearings are accommodated on the inside of the end-toothed component and in yet another embodiment shown in a simplistic illustration, an end toothing of the axial freewheel is integrally formed at the outer bearing race of the hub bearing so as to enable saving axial mounting space if only one hub bearing is used. The drawback is, however, that the axial forces must again be transmitted radially through the bearing into the hub shell. A freewheel must be configured for rotational forces of up to 400 Nm and higher. This means that in the course of operation, the end-toothed component screwed into the hub shell keeps being urged ever further into the hub shell so as to compress the hub shell. These high loads may result in the hub shell breaking or else the wall thicknesses require reinforcing which, however, increases the weight.

Also, hubs with toothed disk freewheels have been disclosed which are provided with a freewheel having an axial toothing, wherein an axial toothing is fixedly integrated in the rotor and a toothed disk is non-rotatably and axially displaceably accommodated in the hub shell by means of one or more springs and is axially biased in the direction toward the toothing in the rotor. Reversely, a hub has been disclosed which includes a toothed disk freewheel and has a toothed disk fixedly integrated in the hub shell and where the other of the toothed disks is biased by means of a spring in the direction of the hub shell. Then again, both these hub types providing for axial movability of only one of the toothed disks have the disadvantage due to the high loads in sports or professional cycling that some of the teeth are subjected to higher loads and faster wear so that early replacement on a regular basis is advisable of the toothed disks, the rotor or even the hub shell to avoid malfunction.

A feasible alternative would be a stiffer configuration overall of a hub with a toothed disk freewheel by employing stiffer and thus heavier materials or by employing greater wall thicknesses which would increase the weight though. However, since in sports and professional cycling each and every gram of weight counts, this does not provide the desired solution.

EP 1 121 255 B1 has disclosed a lightweight hub having a toothed disk freewheel and showing reliable function wherein the teeth of the toothed disks are stressed more evenly. This hub uses a pair of toothed disks, both of which are axially movable and are axially urged toward one another from the outside by means of a spring. The two toothed disks are thus floatingly supported and e.g. in case of the hub flexing or given other types of stresses they may show better positioning to one another so as to provide more even wear on the toothed disks and a particularly reliable operation. However, an even stiffer hub is desirable.

Against the background of the prior art it is therefore the object of the present invention to provide a hub with an axial freewheel wherein the hub-side freewheel component provides defined accommodation of a roller bearing and which offers enhanced ease of maintenance. The hub is in particular intended to be lightweight or more lightweight and preferably its configuration is to be stiffer.

SUMMARY

A hub according to the invention is provided for at least partially muscle-powered vehicles and in particular bicycles and comprises a hub shell which is rotatably supported relative to (and in particular on) a hub axle (in particular by way of two roller bearings disposed on opposite end regions of the hub shell). The hub comprises a rotor rotatably supported by means of at least two rotor bearings relative to and in particular on the hub axle and particularly preferably disposed fixed or axially stationary in the axial direction in operation to non-rotatably dispose at least one sprocket. A freewheel device having two interacting freewheel components is comprised namely, a hub-side freewheel component and a rotor-side freewheel component. The two freewheel components each comprise axial engagement elements and they are movable relative to one another in the axial direction at least between a freewheel position and an intermeshing engaging position wherein in the engaging position a driving torque can be transmitted from the rotor to the hub shell. The hub-side freewheel component comprises an axial, threaded body section and is screwed into the hub shell by means of a thread. The hub-side freewheel component comprises an annular surface on the axially outside surface where the axial engagement elements are formed at least in part. The rolling members of a hub bearing are located in a defined accommodation within the hub-side freewheel component to support the hub shell relative to the hub axle. The hub-side freewheel component comprises at least one tool contour configured to be coupled with a matching tool in particular for unscrewing the hub-side freewheel component from the hub shell or else for tightening the screw connection.

The hub according to the invention has many advantages. The hub according to the invention in particular allows greater ease of mounting and demounting. The hub allows a stiffer architecture than provided in the prior art while still offering uncomplicated maintenance. The laterally axial distance of the roller bearings for supporting the hub shell may be provided considerably larger than in the past. This also allows to considerably improve the lateral stiffness of a wheel equipped therewith.

The rotor and in particular also the hub shell is/are disposed in the same axial positions both in the freewheel position and in the engaging position. In the freewheel position the rotor and the hub shell are in particular decoupled from one another. This means that in the freewheel position no or an insignificant rotational force is transmitted between the hub shell and the rotor.

The axial engagement elements in particular protrude axially and/or act in the axial direction. The annular surface may be disposed on the axially outwardly end. The hub-side freewheel component preferably comprises an annular flange. The annular surface is in particular at least partially formed on the annular flange. Although the annular flange preferably extends radially, inwardly it may extend radially outwardly as well.

The hub-side freewheel component is a separate part and is not integrally formed with the hub shell since a hub shell tends to consist of one or more components of a lightweight material or of several lightweight materials such as light metal or fibrous composite material while the freewheel component is at least in part manufactured from (at least) a/one stronger and thus often heavier material. For example, steel is a suitable material for the freewheel component.

Preferably the hub-side freewheel component comprises (at least) one appendix projecting outwardly and/or inwardly from the axial body section. The appendix may be circumferential in configuration. It is also possible that multiple finger-like appendices are configured.

In particular, is the tool contour formed by projections and/or recesses projecting inwardly and/or outwardly. This allows a tool contour to reliably transmit even high rotational forces and reduces the risk of damage to the tool or the tool contour.

In advantageous specific embodiments the tool contour is configured at least partially or entirely by way of a non-round inner or outer peripheral surface or side surface.

It is preferred for the tool contour to comprise two or more contour elements. Contour elements may be different parts and portions of components such as edges, grooves, toothings, depressions and elevations etc.

The tool contour comprises in particular two or more through holes and/or two or more blind holes. This combines saving weight with providing a simple function.

In advantageous configurations at least part of the tool contour is configured on the annular flange and/or the appendix. This allows efficient utilization of radially inwardly and/or radially outwardly regions. A radially inwardly region is particularly easily accessible.

In particular, at least part of the tool contour is configured on the axial toothing formed by the engagement elements. For example, single engagement elements or regions of the axial toothing may be provided with holes or blind holes for a tool to engage in. Alternately, an inner contour may be provided where parts of the axial toothing are cut out or recessed, providing a non-round tool contour.

In preferred specific embodiments, the hub comprises a tool having a coupling contour which couples with the tool contour. The coupling contour may be matched or adapted to the tool contour partially or entirely. The number of contour elements and pertaining link parts may differ. Alternately, the number may be the same. What is essential is that a coupling can be established. The tool may be a standardized tool intended for other purposes.

In particular, are the rolling members of the hub bearing accommodated in an inner centric receiving space of the axial body section, and the outer ring of the hub bearing is configured on the axial body section or accommodated therein and in that case in particular pressed in.

In this configuration, the hub-side freewheel component forms a bearing seat which accommodates a roller bearing for defined, rotary support of the hub shell. This allows to enlarge by a few millimeters the lateral distance of the bearings to support the hub shell relative to the hub axle. This already achieves a considerably increased rigidity of the hub. Any bending moment acting during pedaling is considerably decreased. The lateral axial distance between the surface of force application for transmitting the driving torque and the bearing position is considerably shorter than in the prior art since the roller bearing is accommodated radially inwardly of the hub-side freewheel component. The distance may even be halved. Moreover, the lateral axial distance of the roller bearings of the hub shell is noticeably increased. The roller bearings for supporting the hub shell relative to the hub axle may be referred to as hub shell bearings. At the same time, the outwardly protruding appendix on the hub-side freewheel component, which in operation shows defined abutting against a shoulder in the hub shell, allows to provide a particularly stable and reliable hub. This achieves a sufficiently stable support in the hub shell even when the hub-side freewheel component is screwed in. This configuration reliably prevents the hub-side freewheel component from penetrating ever further into the hub shell in operation.

Another advantage is that the distance between the two rotor bearings may also be enlarged so as to achieve increased rigidity there. It is also very advantageous that the hub is simpler in its architecture. The hub axle does not require thickening to increase rigidity.

At the same time, the invention allows a clearly more lightweight hub architecture overall which is moreover combined with higher rigidity. A weight advantage is achieved by way of a more lightweight configuration of the hub-side freewheel component. Another weight advantage is achieved by way of configuring the hub shell respectively the hub sleeve with thinner walls. The known prior art provides for the hub shell to surround the roller bearing and the toothed disk accommodated adjacent thereto in the hub shell. However, a minimum wall thickness of the hub shell must be observed to ensure the required stability. In the known prior art, this results in a hub shell showing a considerably larger wall thickness over a clearly larger axial region compared to the present invention. Thus, the invention achieves higher rigidity combined with a lower weight. In addition, the parts required are fewer in number so as to simplify the architecture and assembly and maintenance. Using an outwardly protruding appendix moreover distributes the contact pressure of the hub-side freewheel component in the hub shell over a larger diameter and thus achieves a reduced surface pressure. The radially outwardly protruding appendix prevents the hub-side freewheel component from entering deeper into the hub shell if it is externally threaded and is screwed into the hub shell.

Axial mounting space is saved by way of the invention. Both the hub shell and also the rotor may be provided with broader axial supports than was the case with the prior art known from EP 1 121 255 B1.

Demounting is easy even while the hub-side freewheel component is screwed into the hub shell so that any rolling members having defined accommodation therein are no longer directly accessible. A suitable tool renders demounting easy and uncomplicated.

In the invention, the hub-side freewheel component has an inner and central receiving space with a bearing seat and a roller bearing received thereat to rotatably support the hub shell so as to stiffen the hub. The invention allows to increase an axial distance of the roller bearings of the hub shell. The hub shell may overall be supported on a clearly broader basis to thus considerably improve the lateral stiffness of a wheel equipped therewith.

In a preferred specific embodiment, the two freewheel components are biased in the engaging position by way of at least one biasing device. The freewheel components preferably each comprise engagement elements configured on the front face which mesh with one another in the engaging position. In this way, in the engaging position the engagement elements transmit rotational movement in the driving direction from the rotor to the hub shell. In the freewheel position, a rotation of the freewheel components is possible relative to one another and thus also of the hub shell relative to the rotor.

In all the configurations, it is preferred for the freewheel components to comprise an axial toothing each. The freewheel device is in particular configured as a toothed disk freewheel. Then, the engagement elements are preferably provided by axial teeth which are in particular biased to the engaging position by means of at least one spring or a plurality of springs or spring elements. The number of engagement elements on each freewheel component is in particular between 16 and 80 and in particular between 18 and 72. This allows very quick responses.

Preferably the rotor-side freewheel component is non-rotatably and axially movably accommodated on the rotor and the hub-side freewheel component is non-rotatably and also axially fixedly coupled with the hub shell. The rotor-side freewheel component is in particular configured as, or comprises, a toothed disk and its front face shows an axial toothing.

In preferred specific embodiments and configurations, the axial body section of the hub-side freewheel component respectively at least part of the axial body section is tubular in design and may be referred to as a tubular body section. In preferred configurations the axial or tubular body section has a round outer cross-section. Then, the round outer cross-section is in particular provided with an external thread with which the axial (tubular) body section is preferably screwed into an internal thread of the hub shell when assembled. Then, the axial (tubular) body section is axially fixedly and non-rotatably connected with the hub shell. The tubular body section is preferably configured substantially cylindrically.

In preferred embodiments, the axial body section is configured such that the axial body section with the outwardly protruding appendix and the annular flange projecting in particular inwardly shows a(n at least substantially) T-shaped cross-section. An S- or Z-shaped cross-section is also conceivable. In the case of a T-shaped cross-section the crossbar of the "T" and thus the annular flange and the appendix are preferably disposed axially outwardly while the axial or tubular body sections extend further inwardly into the hub shell respectively into the hub. This configuration and this e.g. T-shaped cross-section allow a compact structure and high stability under load. The axially outside surface (relative to the hub) of the annular flange is equipped with the engagement elements. The axially inside surface (relative to the hub) of the appendix provides a stopper which (in the assembled state) rests against the radial shoulder in the hub shell. This provides a larger volume of material in the hub shell for reliably transmitting the forces acting on the hub shell so as to provide a lightweight though stable hub.

This also applies if grooves or cutouts are made in the annular flange or the appendix to provide a tool receptacle.

The bearing seat is preferably configured on the axial and/or tubular body section and in particular radially inwardly thereof.

In radial section, the hub-side freewheel component is preferably substantially L-shaped in cross-section wherein one of the legs of the "L" forms the axial or tubular body section and the other of the legs of the L extends in the radial direction and is equipped with the engagement elements. The cross-section is particularly preferably "T"-shaped wherein the annular flange and the appendix are axially overlapping or at least approximately located in the same axial position.

Preferably, the hub-side freewheel component accommodates more than ⅔ of the axial width of the roller bearing. In particular, a substantial respectively the most substantial part of the roller bearing shows a defined accommodation on the bearing seat of the hub-side freewheel component. Preferably, the hub-side freewheel component accommodates more than 50% and particularly preferably more than 75% of the axial width of the roller bearing. In preferred configurations, the hub-side freewheel component accommodates between approximately 80% and 90% or between 80% and 99.5% and in particular between 90% and 99.5% of the axial width of the roller bearing. Preferably, there is a clear distance (in the axial direction) between the axially inwardly front face of the axial body section and the hub shell. The clear distance generates a play between the axially inwardly front face of the axial body section and the hub shell and it is in particular larger than 0.02 mm and preferably it is between 0.03 mm and 1.5 mm, in particular between 0.05 mm and 0.6 mm and preferably between 0.08 mm and 0.35 mm. In preferred configurations, the clear distance is between 0.5% and 5% of the axial length of the roller bearing accommodated on the hub-side freewheel component. The clear distance leads to an axial position of the axial body section defined by the radially outwardly protruding appendix and to preventing the axial body section from screwing in ever further. The radially outwardly protruding appendix of the hub-side freewheel component in particular protrudes radially outwardly beyond the axial body section and when mounted it rests against the radial shoulder of the hub shell. This achieves an axially defined position of the hub-side freewheel component. The outwardly protruding appendix may be configured as a singular appendix or else several appendices are provided (symmetrically) distributed over the circumference. The appendices together with the cutouts in-between then form a tool contour for in particular form-fit engagement of a tool. Or else the appendix may be configured as a circumferential flange which extends radially outwardly in particular from the axially outwardly end of the axial body section.

The hub-side freewheel component comprises an annular flange the front face of which is provided with the engagement elements (axially outwardly). The annular flange in particular extends radially inwardly on the axially outwardly end of the axial body section. Then, the annular flange forms the inwardly projecting radial leg of the T or an L as it has been described above.

Preferably a radial bearing shoulder is formed in the hub shell for defined axial alignment of the roller bearing accommodated in the hub-side freewheel component. The roller bearing is in particular disposed in an axially defined position between the radial bearing shoulder in the hub shell and the annular flange. Preferably, a defined play is provided on one axial side and on the other axial side the roller bearing is disposed without play. A disadvantageous overdefinition is thus prevented. Preferably, a free distance is formed between the roller bearing accommodated in the hub-side freewheel component and the axially inside surface of the annular flange. The free distance provides for axial play. The free distance is in particular larger than 0.02 mm or 0.05 mm. The free distance is preferably larger than 0.1 mm or larger than 0.2 mm and may be up to and larger than 0.5 mm or 1 mm. The free distance is provided in particular between the axially inside surface of the annular flange and the outer ring of the freewheel-side roller bearing for the hub shell. In a preferred configuration, the free distance is between 0.02 mm and 0.35 mm.

The outer ring of the freewheel-side roller bearing of the hub shell bears against the radial bearing shoulder in the hub shell in particular with its axially further inwardly end so as to cause defined alignment of the roller bearing. Particularly, preferably a clear distance (in the axial direction) is present between the axially inwardly front face of the axial body section and the hub shell, and a free distance is formed between the roller bearing accommodated in the hub-side freewheel component and the axially inside surface of the annular flange. Preferably, the clear distance and the free distance are approximately the same. Due to existing tolerances of component parts and manufacturing and mounting tolerances the clear distance and the free distance may be configured different. The clear distance and the free distance each prevent an overdefinition in the mounted hub.

In advantageous configurations the biasing device is accommodated in the rotor-side freewheel component. The biasing device is in particular substantially entirely and particularly preferably entirely accommodated inwardly of the rotor-side freewheel component. This offers considerable advantages as regards the axial mounting space since the rotor-side freewheel component does not, or only very little, extend in the axial direction so as to allow saving axial mounting space. This allows to further increase the hub rigidity.

The rotor-side freewheel component in particular comprises an in particular cylindrical guide section having a non-round outer contour meshing with an adapted non-round inner contour in the rotor to enable axial movability of the rotor-side freewheel component relative to the rotor and to provide the non-rotatable coupling between the rotor and the rotor-side freewheel component.

In preferred configurations, the front face end of the rotor-side freewheel component is configured as a washer with the engagement elements disposed thereat (on the front face).

Preferably, the rotor-side freewheel component with the guide section and the washer disposed on the front face end shows a cross-section approximately L-shaped in the radial direction. An axially aligned leg is formed by the guide section. A radially aligned leg is formed by the front-face washer.

Preferably, the biasing device urges the front-face washer with the engagement elements in the direction of the hub-side freewheel component. Then, the biasing device preferably rests against the inside of the washer.

The washer and the (cylindrical) guide section preferably substantially form the rotor-side freewheel component. The guide section and the washer are particularly preferably manufactured integrally.

Particularly preferably, the biasing device is axially supported outwardly (immediately) against a rotor bearing to rotatably support the rotor. Then, the biasing device is particularly preferably directly and immediately supported on an outer bearing ring of the rotor bearing.

In all the configurations, the bearings for supporting the hub shell and the rotor bearings for supporting the rotor are preferably configured as roller bearings, and in particular as deep-groove ball bearings comprising an outer bearing ring (also referred to as outer ring), an inner bearing ring (also referred to as inner ring) and in-between, rolling members disposed in particular in a rolling member cage.

The biasing device may be indirectly supported on a rotor bearing for example if a disk is disposed between the rotor bearing and the biasing device. Supporting the biasing device immediately on the rotor bearing allows a particularly space-saving architecture, at any rate with the biasing device configured as a cylindrical coil spring. In other configurations it is also possible to employ a number of single springs which are supported on the outside of the rotor bearing or other components.

Preferably, a sealing device is provided between the rotor and the hub shell. The sealing device in particular comprises a non-contact labyrinth gap diverting at least once. Furthermore, the sealing device preferably comprises at least one contacting sealing lip in particular downstream of the labyrinth gap. The sealing device in particular prevents access of water and dust to the freewheel device as extensively as possible and in particular the most extensively possible. The sealing lip is preferably provided radially further inwardly than the labyrinth gap.

In all the configurations, it is particularly preferred for the rotor and preferably the hub to be provided for largely or completely no-tools dismantling. The hub shell is preferably plugged, the limit stops are in particular plugged on (inserted or preferably pushed on) and the hub is—optionally apart from the hub-side freewheel component—preferably provided for entirely no-tools dismantling. The hub-side freewheel component may likewise be provided for no-tools dismantling. This facilitates assembly and dismantling and thus also maintenance or repairs.

When assembled, a clamping force of the hub is preferably supported via the inner rings of the roller bearings of the hub shell and the inner rings of the rotor bearings. In particular, at least one sleeve body each is disposed for form-fit force transmission of the clamping force, between the freewheel-side roller bearing of the hub shell and the freewheel-side rotor bearing and between the two rotor bearings. In this way, a form-fitting and particularly stable hub is provided.

Preferably two and in particular exactly two radial bulges are configured on the hub axle. The two radial bulges are preferably configured in the region of the roller bearings to support the hub shell. Preferably, the radial bulges show on the axially inwardly face a (continuous or gradual or stepless or stepped) increase of the wall thickness and a shoulder each is configured on the axially outwardly side. These shoulders may serve as stoppers for the inner bearing cup of the roller bearings to support the hub shell. Optionally, a spacer such as a disk or a sleeve may be inserted between the stopper and the roller bearing. In all of these configurations, forces may be transmitted through the hub axle and the spacers such as disks, sleeve bodies and inner bearing cups of the roller bearings.

Particularly preferably, the hub axle is configured cylindrical and, other than the radial bulges against which the roller bearings rest to support the hub shell, it shows a substantially constant diameter and a substantially constant wall thickness wherein the diameter and the wall thickness vary by less than 25% and preferably less than 15%. The interior of the hub axle is particularly preferably cylindrical in configuration.

Preferably, the roller bearings disposed on the opposite end regions of the hub shell rest axially inwardly with their respective inner rings against radial bulges of the hub axle. The hub axle is thus employed for form-fit force transmission.

Particularly preferably, at least one of the roller bearings and/or the rotor bearings is configured as a deep-groove ball bearing and in particular as a commercially available and/or standardized deep-groove ball bearing. At least one of the roller bearings and/or the rotor bearings is preferably provided with a rolling member cage and/or bearing seals directly attached to the roller bearing and preventing entry of water and/or dust into the interior of the roller bearing.

In all the configurations it is preferred for the hub to be designed for use with a through axle. Preferably, the hub comprises a through axle.

It is preferred to provide limit stops which are pushed onto the axle or hub axle or inserted into the hub axle. It is possible to provide exchangeable limit stops with one set of limit stops configured to accommodate a through axle and another set of limit stops provided to accommodate for example a quick release. The latter set of limit stops shows axially outwardly cylindrical shoulders which are configured to be received in the dropouts of a frame and whose outer diameter is preferably smaller than an inner diameter of the hub axle in a central region of the hub axle When the hub is delivered with two sets of limit stops, the user may choose whether to use them with the through axle or with a quick release. Later retrofitting is also possible.

All the configurations may be provided with more than two roller bearings to support the hub shell. Then, at any rate (at least) one roller bearing is disposed on each of the two end regions. More than two rotor bearings may likewise be employed.

Further advantages and features of the present invention can be taken from the exemplary embodiments which will be discussed below with reference to the enclosed figures.

BRIEF DESCRIPTION OF THE DRAWINGS

The figures show in:

FIG. 8 a section of another hub according to the invention;

FIG. 9 a perspective illustration of the hub-side freewheel component of the hub according to FIG. 8;

FIG. 10 a section of the hub-side freewheel component according to FIG. 9;

DETAILED DESCRIPTION

Figure 1:
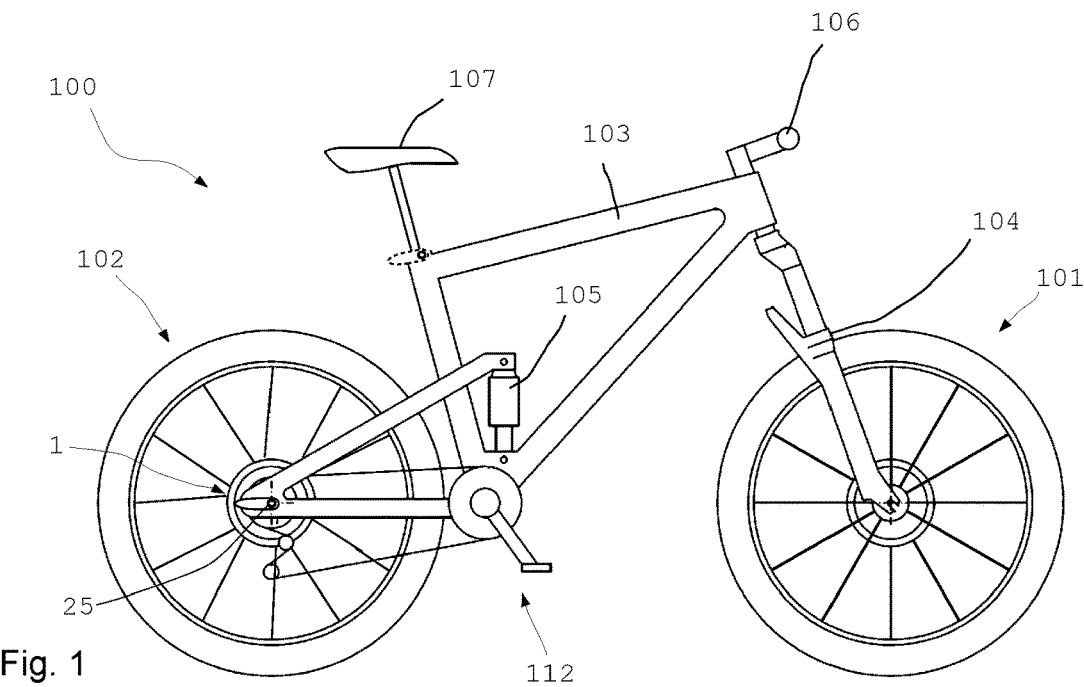
FIG. 1 a schematic illustration of a mountain bike.
Figure 2:
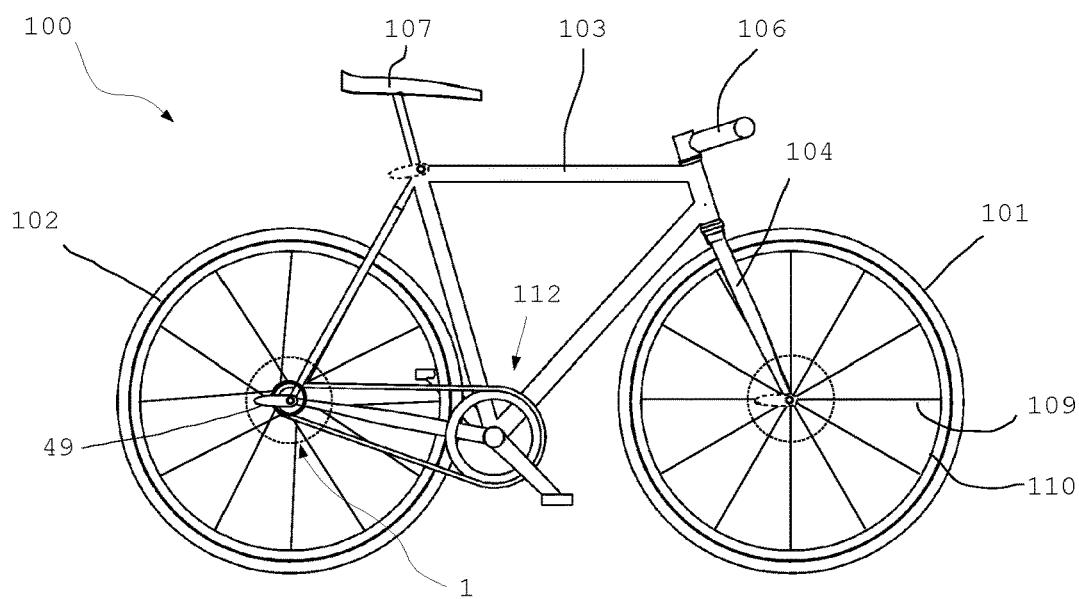
FIG. 2 a schematic illustration of a racing bicycle.

The FIGS. 1 and 2 illustrate a mountain bike or racing bicycle 100 respectively which are equipped with a hub 1 according to the invention. The mountain bike or racing bicycle 100 is provided with a front wheel 101 and a rear wheel 102. The hub 1 according to the invention is used with the rear wheel 102. The two wheels 101, 102 are provided with spokes 109 and a rim 110. Conventional caliper brakes or other brakes such as disk brakes may be provided.

A bicycle 100 comprises a frame 103, a handlebar 106, a saddle 107, a fork or suspension fork 104 and in the case of the mountain bike, a rear wheel damper 105 may be provided. A pedal crank 112 with pedals serves for driving. Optionally the pedal crank 112 and/or the wheels may be provided with an electrical auxiliary drive. The hubs 1 of the wheels may be attached to the frame by means of a through axle 25 or a quick release 49.

Figure 3:
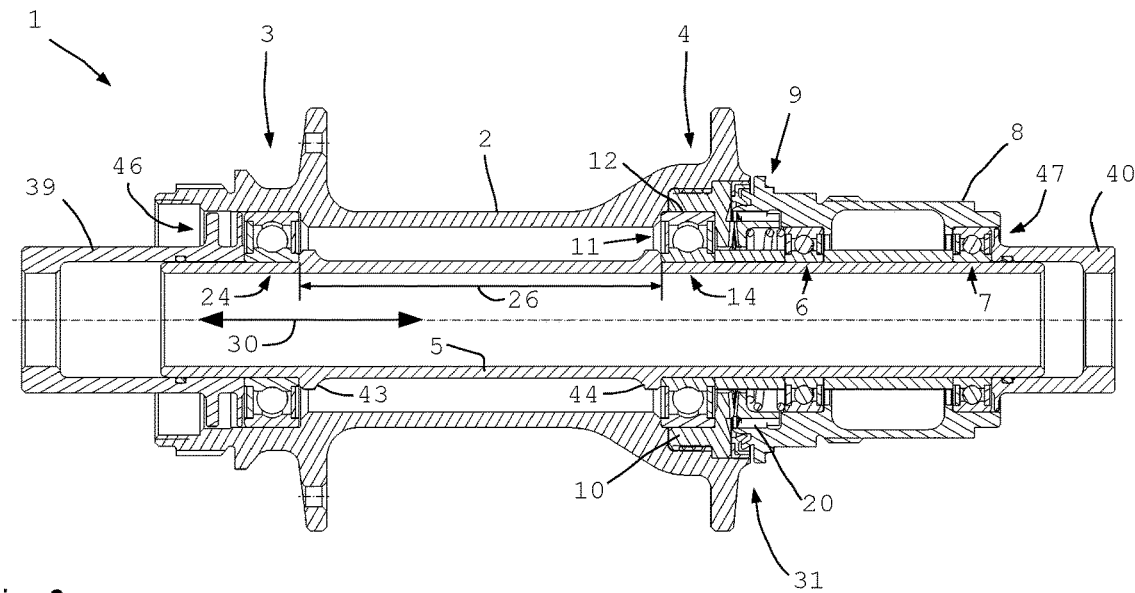
FIG. 3 a section of a hub according to the invention.

FIG. 3 shows in a section the hubs 1 inserted in the rear wheels 102 in the bicycles according to FIGS. 1 and 2.

The hub 1 according to the invention comprises a hub shell 2 which is rotatably supported in the axial end regions 3 and 4 by means of the roller bearings 24 respectively 14 to be rotatable relative to, and presently immediately on, a hub axle 5. This means that the roller bearings 14, 24 are each directly disposed on the hub axle 5.

The hub furthermore comprises a rotor 8 on which to dispose at least one sprocket. In particular, a sprocket cluster may be pushed on and attached or arranged. A freewheel device 9 is provided between the rotor 8 and the hub shell 2, comprising the hub-side freewheel component 10 and the rotor-side freewheel component 20. To prevent penetration of water and dust into the interior of the hub 1 and in particular admission of water and dust to the freewheel device 9, a sealing device 38 is configured between the rotor 8 and the hub shell 2 comprising a labyrinth-like sealing gap and a downstream lip seal contacting the rotor and reliably protecting the freewheel from entry of dirt and water.

Limit stops 39 and 40 are pushed onto the two ends of the hub axle which—while the wheel equipped therewith is not clamped in the frame—are secured on the hub axle by way of O-rings 48. The limit stops 39 and 40 are each provided with a sealing flange 46 or 47 protecting the ends of the hub 1 from entry of dirt and water. This rotor-side limit stop 40 is provided with a radial sealing flange 47 while the other limit stop 39 is provided with a double flange 46 consisting of a pair of radial sealing flanges between which an axial distance and free space is formed.

The roller bearings 14, 24 for rotatably supporting the hub shell 2 rest on radial shoulders in bulges 43, 44 of the hub axle 5. The bulges 43 and 44 are each located axially inwardly of the bearings 14, 24.

In all the configurations of the hub 1 the bulges 43, 44 preferably show a somewhat larger radial wall thickness of the hub axle 5. In particular, is the radial wall thickness in this region between about 1.5 times and 3 times the radial wall thickness in the other regions. Other than the bulges 43, 44 the hub axle 5 is substantially a hollow cylinder in configuration and shows differences in the wall thickness of preferably less than 25% and in particular less than 15% or less than 10% or less than 5% or less than 2%. Preferably, a relationship of the maximum outer diameter of the hub axle (incl. bulge) to the minimum inner diameter of the hub axle is less than 2.0 and in particular less than 1.75 and preferably less than 1.6. Preferably, the relationship of the maximum outer diameter of the hub axle to the minimum inner diameter of the hub axle is larger than 1.25 and in particular larger than 1.4.

The rotor 8 is rotatably (and immediately) supported on the axle 5 by means of a pair of rotor bearings 6 and 7.

The roller bearing 14 is accommodated inwardly of the hub-side freewheel component 10 in a central receiving space 11 in a defined location, presently pressed-in, on a bearing seat 12. This allows to save considerable axial mounting space so that the stability and rigidity of the hub can be increased. Moreover, the total weight of the hub 1 is considerably reduced. Both the weight of each of the freewheel components and the weight of the hub shell can be reduced since the wall thickness in the rotor-side end region 4 of the hub shell 2 can be reduced.

Figure 4:
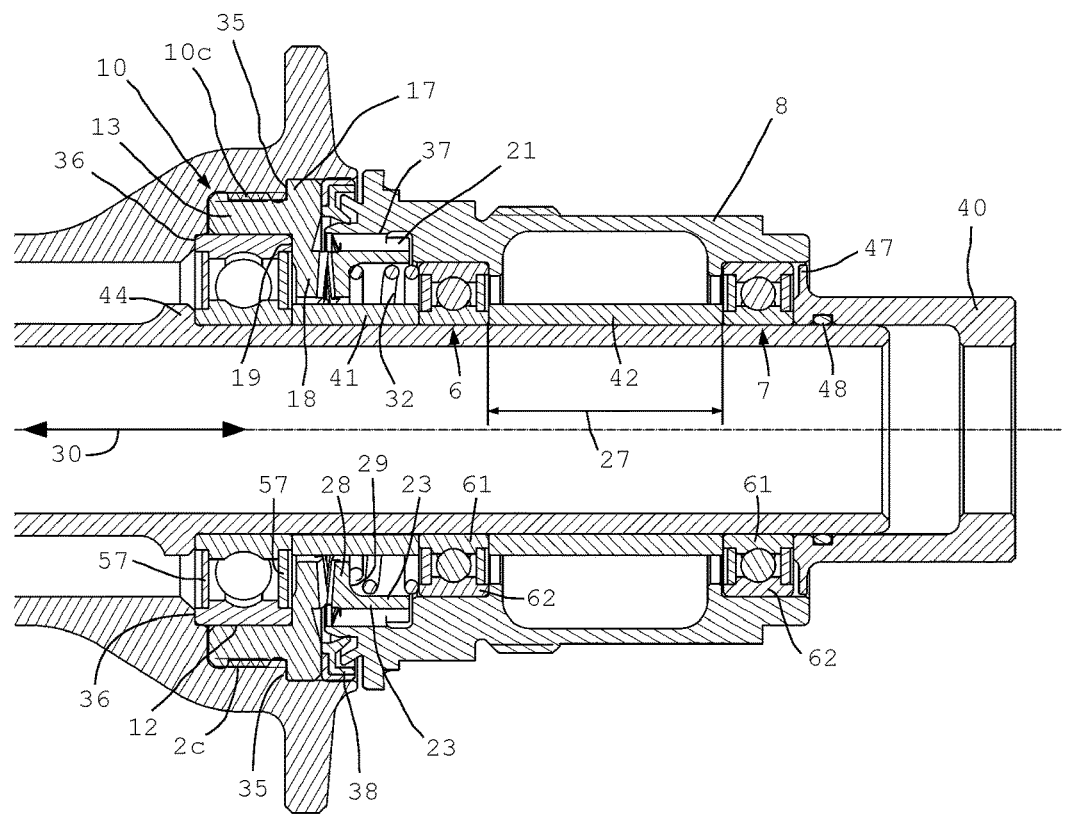
FIG. 4 an enlarged detail of the section in FIG. 3.

FIG. 4 shows an enlarged detail from FIG. 3, with the freewheel device 9 once again shown in the engaging position 31, in which the engagement elements 33 (see FIGS. 5 and 6) designed in particular as axial toothings 10*d*, 20*d*, of the freewheel component 10 and the freewheel component 20 are in non-rotatable engagement with one another. The engagement elements 33 are configured such (see for example FIG. 5) that given a rotational direction in the driving direction a rotational force is reliably transmitted to the hub shell 2 while given an opposite rotational direction the freewheel component 20 is urged axially outwardly counter to the biasing force of the biasing device 32 until the engagement elements 33 disengage so as to enable a rotation of the rotor relative to the hub shell. The hub-side freewheel component 10 comprises an axial body section 13 provided with a thread 10*c*. The hub-side freewheel component 10 has an annular surface 18*d*. The annular surface 18*d* is in particular provided on the axially outside surface 18*b* of the annular flange 18. Then, this is where the axial engagement elements 33 of the axial toothing 10*d* are configured.

The rotor-side freewheel component 20 is provided with a guide section 23 showing a non-round outer contour 21. The non-round outer contour 21 meshes with a matching, non-round inner contour 37 in the rotor 8 and is axially displaceable in parallel to the axial direction 30 in the rotor 8.

This freewheel component 10 shows an approximately T-shaped configuration in radial cross-section. The freewheel component 10 is axially fixedly and (in the driving direction) non-rotatably connected with the hub shell 2.

A cylindrical bearing seat 12 is formed radially inwardly of the axial body section where the rotor-side roller bearing 14 is accommodated to rotatably support the hub shell 2. When the roller bearing 14 is mounted it is form-fittingly accommodated in the axial direction with its inner ring between the bulge 44 and the sleeve body 41. The rolling members 53 of the roller bearing or hub bearing 14 show a defined accommodation inside the hub-side freewheel component 10 to support the hub shell 2 relative to the hub axle 5. This rolling member 53 is inserted directly into the hub shell and preferably pressed in. This is to ensure defined accommodation.

As will be discussed with reference to the FIGS. 5 to 7, the hub-side freewheel component 10 comprises at least one tool contour 70 which couples to an adapted tool 80 to provide for ease of releasing the screw connection of the hub-side freewheel component 10 from the hub shell 2. During riding the hub-side freewheel component 10 tightens automatically and in the counterrotation direction the freewheel automatically disengages due to the axial toothings. This is why a tool contour 70 considerably facilitates mounting and demounting.

The force-fit is effected in the axial direction 30 from the limit stop 40 via the inner ring of the rotor bearing 7, the sleeve body 42, the inner ring of the rotor bearing 6, the sleeve body 41, the inner ring of the roller bearing 14 and it is then introduced via the radial bulge 44 into the hub axle 5 from where it is transmitted via the radial bulge 43 to the inner ring of the roller bearing 24 from where the clamping force is ultimately dissipated via the limit stop 39.

In the mounted state the appendix 17 of the hub-side freewheel component 10 protruding outwardly and in this exemplary embodiment configured circumferentially rests against a radial shoulder 35 within the hub shell 2. The position of the hub-side freewheel component 10 is defined by the radial shoulder 35 in the hub shell.

The roller bearing 14 for supporting the hub shell is accommodated on the bearing seat 12 in the central receiving space 11 and takes a defined position in the hub shell 2 in the axial direction by way of the inner surface 19 of the annular flange 18 of the hub-side freewheel component 10 and the radial bearing shoulder 36. There is preferably a small axial play between the inner surface 19 of the annular flange 18 and the outer ring 50 of the roller bearing 14 while the roller bearing 14 rests against the radial bearing shoulder 36 in the hub shell 2 without play.

The roller bearing 14 preferably has a sealing unit 57 for sealing the roller bearing. Likewise, the other roller bearing 24 and the rotor bearings 6 and 7 are preferably each provided with such sealing units 57 for sealing on both sides.

The rotor-side freewheel component 20 comprises on its front face 22 a washer 28 on which the engagement elements 33 are configured. The washer 28 is in particular configured integrally with a cylindrical guide section 23 of the rotor-side freewheel component 20. In the interior of the freewheel component 20 the biasing device 32 configured in particular as a coil spring preferably presses against the front face inner surface 29 so that the freewheel component 20 is biased in the engaging position 31. The coil spring 32 is supported at the other end preferably on the outer ring of the rotor bearing 6. This achieves a minimum axial mounting space whereby the rigidity of the hub can be markedly increased overall.

As is illustrated in FIG. 3, an axial distance 26 between the roller bearings 14 and 24 for rotatably supporting the hub shell is achieved which is clearly larger than in the prior art. This allows to considerably increase the rigidity and stability of the hub. This considerable increase of the axial distance 26 by several millimeters allows to eliminate a double-end, floating axial support of the freewheel components 10 and 20 while still providing increased rigidity of the hub. The freewheel components 10, 20 which are in particular configured as toothed disks show even wear and a safe function is achieved. Moreover, the weight of the hub can be clearly reduced. Compared to the prior art the axial distance 26 between the inner rings of the roller bearings for supporting the hub shell can be enlarged by more than 5 or even 6 mm. The axial distance 27 between the rotor bearings may likewise be increased by more than 1 mm so that the stability under load of the hub 1 increases and the lateral stiffness can be considerably increased.

Figure 5:
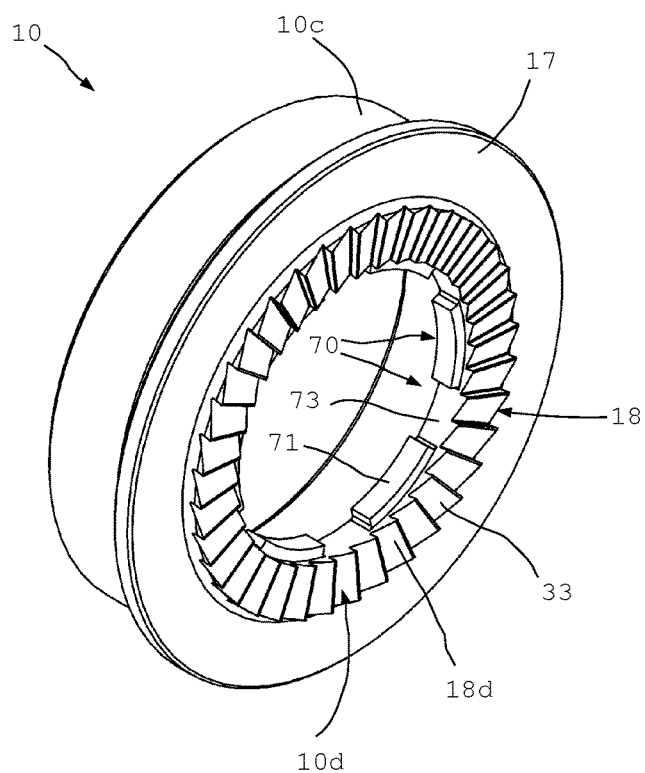
FIG. 5 a perspective illustration of the hub-side freewheel component.
Figure 6:
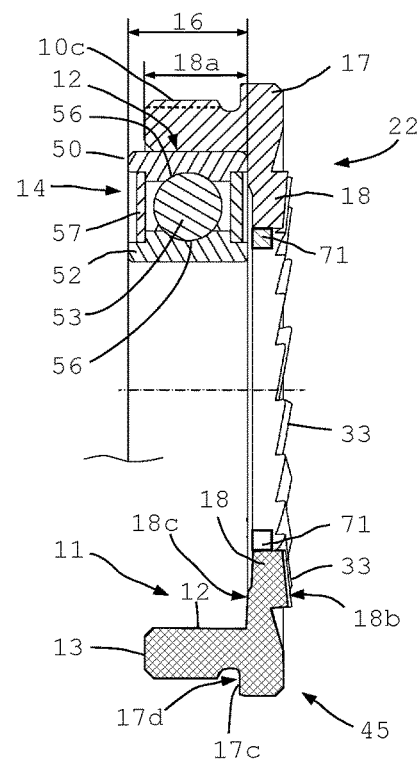
FIG. 6 a section of the hub-side freewheel component according to FIG. 5.

FIGS. 5 and 6 show the hub-side freewheel component 10 in a perspective view and in section. It is apparent that the hub-side freewheel component allows a compact architecture. The annular appendix 17 allows a defined axial positioning of the hub-side freewheel component 10 in the hub shell 2. The engagement elements 33 are formed on the axially outside surface 18b on the front face 22 of the annular flange 18 which extends radially inwardly in particular from the axial and presently tubular body section 13.

In FIG. 5, one can recognize the tool contour 70 respectively the projections 71 and the recesses 73 of the tool contour 70. This tool contour 70 is configured on the annular surface 18d on the annular flange 18 and comprises projections projecting radially inwardly or viewed relative thereto, recesses 73 projecting outwardly. The tool contour 70 on the whole forms a non-round peripheral surface 75 which is actuated by a suitable tool. The tool contour 70 may, as in this case, comprise two or more contour elements 71, 73.

In radial cross-section, the approximately T-shaped structure 45 of the hub-side freewheel component 10 can be seen where the bearing seat 12 is formed radially inwardly where the roller bearing 14 shows a defined accommodation. The tool contour 70 is provided on the annular flange 18.

The roller bearing 14 has an axial width 16 and is supported in the axial body section 13 on the bearing seat 12 over the length 18a across the majority, presently between 80% and 90%, of its axial width. The fact that the roller bearing 14 protrudes somewhat axially inwardly may moreover ensure a precisely defined axial arrangement. An axial overdefinition is avoided.

The roller bearing 14 has an outer ring 50 and an inner ring 52 between which the rolling members 53 are disposed in guide grooves 56. Sealing units 57 seal the roller bearing 14 in both axial directions.

For better clarity the illustration of the roller bearing 14 was omitted in the bottom part of FIG. 5. When the roller bearing 14 is installed it is axially secured in the hub shell by the freewheel component 10 screwed into the hub shell.

Figure 7:
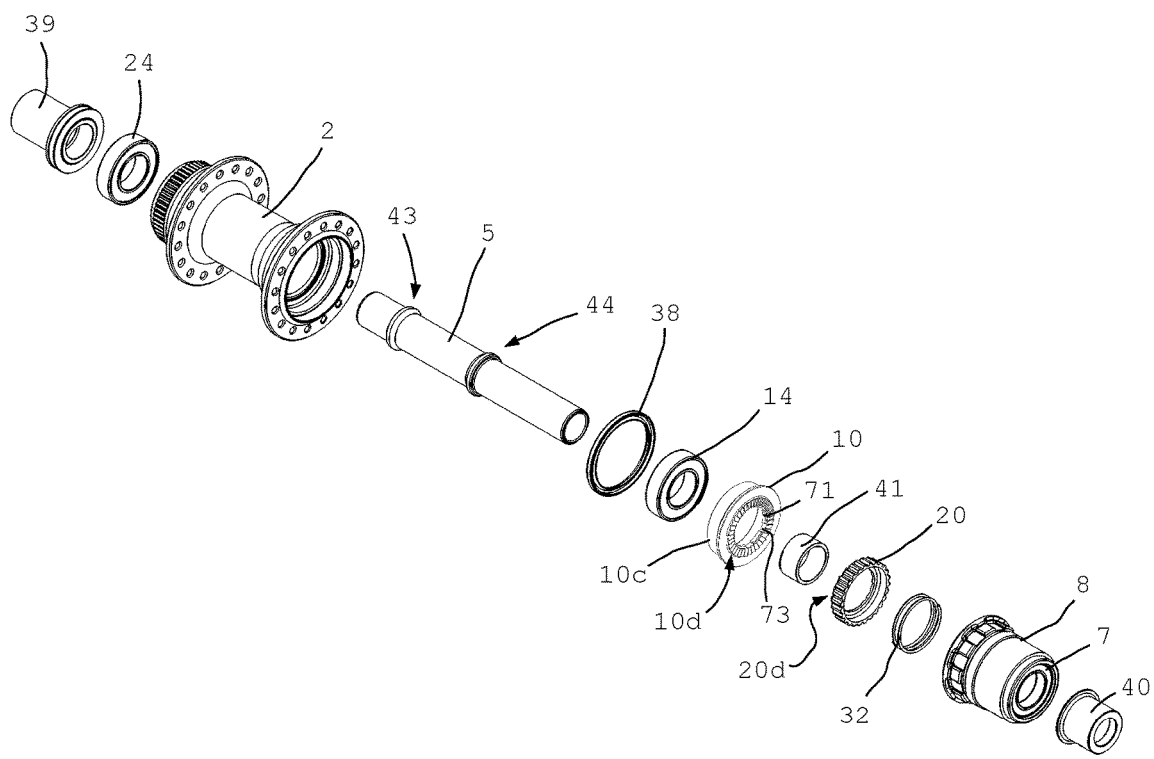
FIG. 7 an exploded view of the hub according to FIG. 3.

FIG. 7 shows an illustration of essential parts of the hub 1 according to the invention. On the left, the limit stop 39 is shown which after installation or insertion of the roller bearing 24 into the hub sleeve 2 can be pushed onto the hub axle 5. The hub axle 5 shows radial bulges 43 and 44. On the rotor side of the hub shell 2, the roller bearing 14 is accommodated on the bearing seat 12 of the hub-side freewheel component 10 and is screwed into the hub shell 2 together with the freewheel component 10. Thereafter, the sealing device 38 is inserted and the sleeve body 41 is pushed on.

Figure 12:
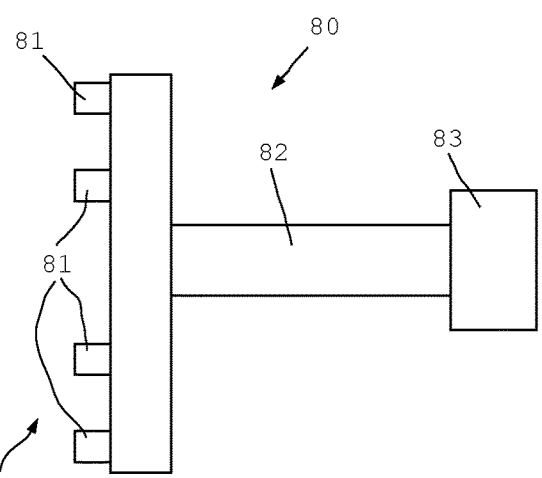
FIG. 12 a schematic view of a fitted tool.
Figure 14:
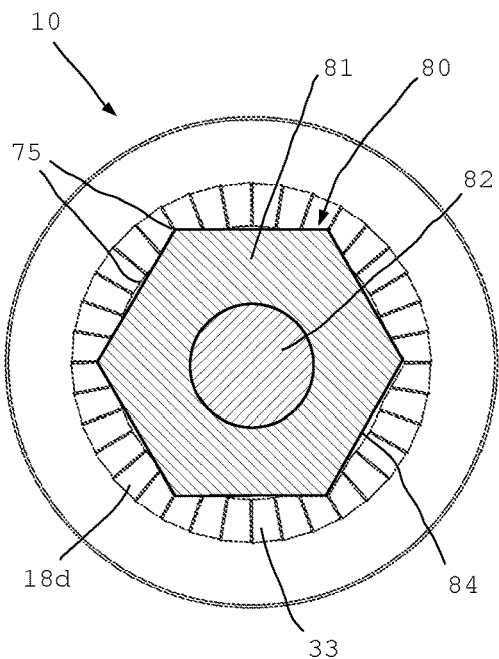
FIG. 14 a top view of the hub-side freewheel component according to FIG. 13 with a pertaining tool shown in section.

An adapted or adjustable tool 80 is used for releasing as is schematically illustrated in the FIG. 12 or 14. This tool comprises at least two fingers or engaging dogs projecting outwardly and meshing with the recesses 73. A non-rotatable connection for mounting or demounting can thus be established.

The rotor bearings 6 and 7 with the sleeve body 42 in-between are inserted into the rotor 8. The biasing device 32 and the rotor-side freewheel component 20 are inserted into the rotor 8 and the rotor 8 is pushed onto the hub axle 5. Finally, the limit stop 40 is pushed on.

The FIGS. 8 to 10 illustrate a slightly modified exemplary embodiment. The reference numerals are identical so that the description of the previous exemplary embodiment may be referred to identically, apart from a few deviating parts, and it serves again to describe this exemplary embodiment. Substantial differences and the substantial parts deviating from the preceding exemplary embodiment will be discussed below.

FIG. 8 shows a section of the complete hub, FIG. 9 shows a perspective illustration of the hub-side freewheel component 10 and FIG. 10 shows a section of FIG. 9.

Unlike in the previous exemplary embodiment this hub 1 is not provided with radially circumferential spoke flanges but the hub 1 is equipped with accommodations for mounting so-called "straight pull" spokes. Then the hub shell may be configured accordingly to accommodate e.g. straight, non-cranked spokes ("straight pull spokes"). However, the hub 1 according to FIG. 8 may be equipped as is the hub 1 according to FIG. 3, with conventional and circumferential spoke flanges or the like.

The tool contour 70 shown is configured on the outwardly projecting appendix 17 and again consists of projections 72 and recesses 74. The peripheral surface 75 respectively the ensuing cutouts may be used with an adapted tool 80 for non-rotatable coupling. In a simple case the recesses are mill-cut from the originally circumferential appendix 17. Two, three, four, five, six or more projections and recesses may be provided. The number of coupling parts may—though it does not need to—correlate therewith.

Another difference to the hub 1 according to FIG. 3 is that both FIG. 8 and FIG. 10 explicitly show a recognizable, free distance 16a. The free distance 16a provides sufficient axial play. The roller bearing 14 accommodated in the freewheel component 10 rests against the axially inwardly end 14a showing the outer bearing ring respectively outer ring 50 on the bearing shoulder 36 in the hub shell 2 to provide defined alignment of the roller bearing 14.

The axially outwardly end 14b of the roller bearing 14 shows the free distance 16a respectively the play or the gap between itself and the axially inside surface 18c of the annular flange 18. The free distance 16a is in particular larger than 0.01 mm and it is preferably more than 0.1 mm, in particular approximately 0.2 mm. The exemplary embodiment according to FIG. 3 also comprises a (narrower) free distance 16a which is not recognizable in the scale of the drawing.

FIG. 10 shows the stopper 17d formed on the axially inside surface 17c of the appendix 17. In the mounted state the stopper 17d rests against the radial bearing shoulder 36 in the hub shell. The stopper 17d together with the radial bearing shoulder 36 prevents the hub-side freewheel component from screwing ever further into the hub shell 2. Absent such boundary, any rotational force acting on the axial toothing will over time result in ever increasing screwing in. Thus, absent the stopper 17d, the hub shell may be dilated and even burst since the freewheel is configured for transmitting rotational forces of up to 400 Nm or more.

Another contribution is due to the clear distance 13b which is configured (in the axial direction) between the axially inwardly front face of the axial body section and the hub shell and is presently between approximately 0.08 mm and 0.35 mm. This is to ensure that the axial body section 13 screws into the hub shell up to the stopper 17d where it is supported on the hub shell.

Figure 11:
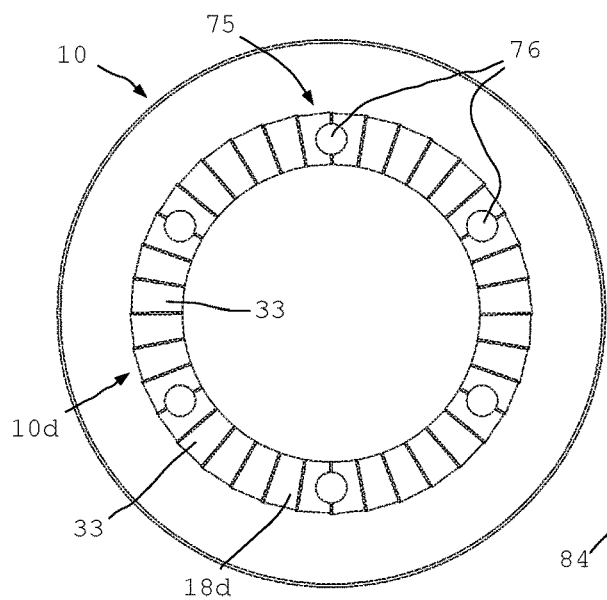
FIG. 11 a top view of another hub-side freewheel component.

FIG. 11 shows another embodiment of a hub-side freewheel component 10, specifically a top view of the axially outwardly front face. The hub-side freewheel component 10 in turn is provided with an axial toothing 10d with engagement elements 33 on the annular surface 18d, the region of the axial toothing 10d being provided with through holes or preferably blind holes 76 providing a tool contour 70. In this case, six blind holes 76 distributed symmetrically are provided. Alternately, more or less holes may be provided, and a symmetric distribution of the blind holes 76 is not required.

FIG. 12 schematically shows a tool 80 for the embodiment according to FIG. 11 wherein finger-like projections or pins are provided for coupling parts 81. This tool is provided with a shaft 82 and e.g. a handle 83. This is where a connection such as a cross hole may be configured through which a rod may be passed so as to allow applying a larger rotational force.

Figure 13:
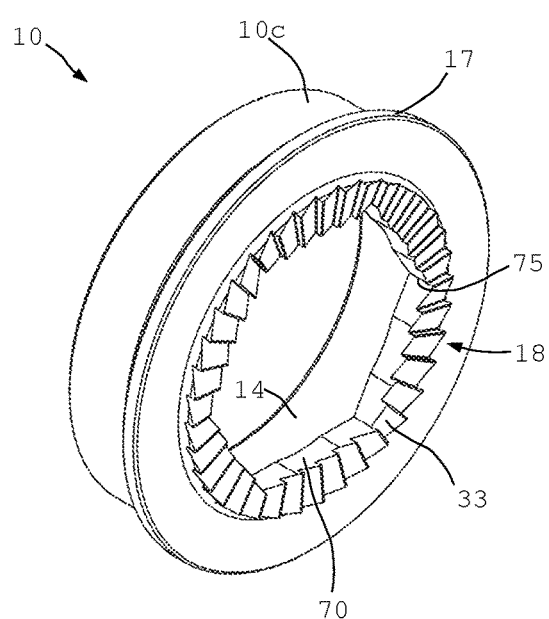
FIG. 13 a perspective view of another hub-side freewheel component.

FIG. 13 shows another embodiment of a hub-side freewheel component 10 in a perspective illustration and FIG. 14 shows a top view with the tool 80 applied.

In this case, the tool contour 70 is formed by a polygonal, presently hexagonal cutout provided radially inwardly. The tool 80 in FIG. 14 is configured correspondingly matching so as to allow form-fit insertion.

In all the cases it is possible for at least part of the tool contour 70 to be configured on the annular flange 18 (as in this case) and/or on the appendix 17.

The tool 80 may be enclosed to the hub 1 to provide ease of mounting and demounting.

Dismantling and maintenance of the hub 1 is accordingly simple and may be performed manually anytime to clean the hub after use for example in off-road terrain or following an extended road ride. This enables to ensure an always reliable function.

The hub enables increased lateral stiffness, increased bending stiffness, and a still safe operation. At the same time, the weight may be reduced which is of particular importance in the area of sports and for professional use.

Another advantage is the smaller cross-section of the hub shell which is thus aerodynamically better. The quantity of parts is smaller so as to make servicing, assembly and disassembly easier. Manufacturing the hub is also easier.

In all the configurations, it is preferred to employ ground inner bearing rings in the roller bearings. A ground outer ring may also be employed so as to obtain very low frictional values.

While a particular embodiment of the present invention has been described herein, it will be appreciated by those skilled in the art that changes and modifications may be made thereto without departing from the invention in its broader aspects and as set forth in the following claims.

| List of reference numerals: | |
|---|---|
| 1 | hub |
| 2 | hub shell |
| 2c | thread, internal thread |
| 3, 4 | end region |
| 5 | hub axle |
| 6, 7 | rotor bearing |
| 8 | rotor |
| 9 | freewheel device |
| 10 | hub-side freewheel component |
| 10c | thread, internal thread |
| 10d | axial toothing |
| 11 | receiving space |
| 12 | bearing seat |
| 13 | axial body section |
| 13a | axially inwardly front face |
| 13b | clear distance |
| 14 | roller bearing |
| 14a | axially inwardly end |
| 14b | axially outwardly end |
| 16 | axial width |
| 16a | distance |
| 17 | appendix |
| 17c | axially inside surface |
| 17d | stopper |
| 18 | annular flange |
| 18a | length of 18 |
| 18b | axially outside surface |
| 18c | axially inside surface |
| 18d | annular surface |
| 19 | inner surface of 18 |
| 20 | rotor-side freewheel component |
| 20d | axial toothing |
| 21 | outer contour |
| 22 | front face of 10, 20 |
| 23 | cylindrical guide section |
| 24 | roller bearing |
| 25 | through axle |
| 26 | bearing distance 14, 24 |
| 27 | bearing distance 6, 7 |
| 28 | washer |
| 29 | inner surface of 28 |
| 30 | axial direction |
| 31 | engaging position |
| 32 | biasing device |
| 33 | engagement elements |
| 35 | radial shoulder in 2 |
| 36 | radial bearing shoulder in 2 |
| 37 | inner contour in 8 |
| 38 | sealing device |
| 39, 40 | limit stop |
| 41, 42 | sleeve body |
| 43, 44 | radial bulges |
| 45 | T-shape |
| 46 | double flange of 39 |
| 47 | sealing flange of 40 |
| 48 | O-ring |
| 49 | quick release |
| 50 | outer ring of 14 |
| 51 | outer ring of 24 |
| 52 | inner ring |
| 53 | rolling member |

-continued

| List of reference numerals: | |
| --- | --- |
| 55 | raceway at 50 |
| 56 | guide groove |
| 57 | sealing unit |
| 58 | seal ring |
| 60 | outer ring of 6, 7 |
| 61 | inner ring of 6, 7 |
| 70 | tool contour |
| 71, 72 | projection |
| 73, 74 | recess |
| 75 | peripheral surface |
| 76 | blind hole |
| 77 | contour element |
| 80 | tool |
| 81 | coupling part |
| 82 | shaft |
| 83 | grip member |
| 84 | coupling contour |
| 100 | bicycle |
| 101 | wheel, front wheel |
| 102 | wheel, rear wheel |
| 103 | frame |
| 104 | fork, suspension fork |
| 105 | rear wheel damper |
| 106 | handlebar |
| 107 | saddle |
| 109 | spoke |
| 110 | rim |
| 112 | pedal crank |

The invention claimed is:

1. A hub for at least partially muscle-powered vehicles, comprising: a hub shell which is rotatably supported relative to a hub axle, a rotor rotatably supported relative to the hub axle by at least two rotor bearings, and a freewheel device having two interacting freewheel components namely, a hub-side freewheel component and a rotor-side freewheel component;

wherein the two freewheel components each comprises axial engagement elements and are movable relative to one another in the axial direction at least between a freewheel position and an intermeshing engaging position, wherein in the engaging position, a driving torque can be transmitted in the direction of drive rotation, wherein the hub-side freewheel component comprises an axial body section which is provided with a thread and is screwed into the hub shell by means of a thread and wherein the hub-side freewheel component comprises an axial annular surface on which the axial engagement elements are formed at least in part; and the rolling members of a hub bearing provide a defined accommodation inside the hub-side freewheel component to support the hub shell relative to the hub axle, and the hub-side freewheel component comprises at least one tool contour which is configured to couple to an adapted tool for releasing a screw connection of the hub-side freewheel component with the hub shell.

2. The hub according to claim 1, wherein the hub-side freewheel component comprises an annular flange wherein the annular surface is at least partially configured on the annular flange.

3. The hub according to claim 1, wherein the hub-side freewheel component comprises an appendix protruding outwardly from the axial body section.

4. The hub according to claim 1, wherein the tool contour is formed by projections or recesses projecting inwardly or outwardly.

5. The hub according to claim 1, wherein the tool contour is formed by a non-round peripheral surface.

6. The hub according to claim 1, wherein the tool contour comprises two or more contour elements.

7. The hub according to claim 1, wherein the tool contour comprises two or more holes.

8. The hub according to claim 1, wherein at least part of the tool contour is configured on the annular flange or the appendix.

9. The hub according to claim 1, wherein at least part of the tool contour is configured on the axial toothing formed by the engagement elements.

10. The hub according to claim 1, wherein the rolling members of the hub bearing are accommodated in an inner centric receiving space of the axial body section and the outer ring of the hub bearing is configured or accommodated on the axial body section.

11. The hub according to claim 1, wherein the axial body section with an outwardly protruding appendix and an inwardly projecting annular flange shows a T-, S-, or Z-shaped cross-section.

12. The hub according to claim 1, wherein the hub-side freewheel component accommodates more than ⅔ of the axial width of a roller bearing.

13. The hub according to claim 1, wherein a radial bearing shoulder is formed in the hub shell for defined axial alignment of a roller bearing accommodated in the hub-side freewheel component.

14. The hub according to claim 1, wherein a free distance is configured between a roller bearing accommodated in the hub-side freewheel component and an axially inside surface of an annular flange or wherein a clear distance is configured between an inner axial front face of the axial body section and the hub shell.

15. The hub according to claim 1, comprising a tool showing a coupling contour which couples with a tool contour.

16. The hub according to claim 1, wherein the tool contour is formed by projections and recesses projecting inwardly or outwardly.

17. The hub according to claim 1, wherein at least part of the tool contour is configured on the annular flange and the appendix.

18. The hub according to claim 1, wherein a free distance is configured between a roller bearing accommodated in the hub-side freewheel component and an axially inside surface of an annular flange and wherein a clear distance is configured between an inner axial front face of the axial body section and the hub shell.

* * * * *